United States Patent
Di Vincenzo

(10) Patent No.: US 9,330,154 B2
(45) Date of Patent: May 3, 2016

(54) MULTICAST DATABASE REPLICATION

(75) Inventor: James John Di Vincenzo, Highlands Ranch, CO (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 13/214,302

(22) Filed: Aug. 22, 2011

(65) Prior Publication Data

US 2013/0054526 A1 Feb. 28, 2013

(51) Int. Cl.
*G06F 17/30* (2006.01)
*H04L 12/18* (2006.01)

(52) U.S. Cl.
CPC .... *G06F 17/30575* (2013.01); *G06F 17/30174* (2013.01); *H04L 12/185* (2013.01)

(58) Field of Classification Search
USPC ........................................ 707/634; 709/232
See application file for complete search history.

(56) References Cited

U.S. PATENT DOCUMENTS

| | | | | |
|---|---|---|---|---|
| 7,467,265 B1 * | 12/2008 | Tawri et al. | ............... | 711/161 |
| 7,680,995 B1 * | 3/2010 | Chang | ............... | 711/162 |
| 7,933,868 B2 * | 4/2011 | Singh et al. | ............... | 707/625 |
| 8,000,261 B2 * | 8/2011 | Nimon et al. | ............... | 370/254 |
| 8,671,200 B2 * | 3/2014 | Siemens | ............... | 709/227 |
| 8,682,847 B2 * | 3/2014 | Zoltan et al. | ............... | 707/615 |
| 8,732,236 B2 * | 5/2014 | Altmaier et al. | ............... | 709/203 |
| 2003/0126162 A1 * | 7/2003 | Yohe et al. | ............... | 707/201 |
| 2007/0198737 A1 * | 8/2007 | Xu et al. | ............... | 709/230 |
| 2008/0288458 A1 * | 11/2008 | Sun et al. | ............... | 707/3 |
| 2009/0083279 A1 * | 3/2009 | Hasek | ............... | 707/10 |
| 2009/0262662 A1 * | 10/2009 | Ramachandran et al. | ..... | 370/254 |
| 2011/0196837 A1 * | 8/2011 | Savunen et al. | ............... | 707/634 |
| 2012/0005174 A1 * | 1/2012 | Vora | ............... | 707/703 |
| 2012/0030171 A1 * | 2/2012 | Kottomtharayil | ............ | 707/634 |
| 2012/0290535 A1 * | 11/2012 | Patel et al. | ............... | 707/634 |

* cited by examiner

*Primary Examiner* — Sherief Badawi
*Assistant Examiner* — Christopher J Raab
(74) *Attorney, Agent, or Firm* — Sterne, Kessler, Goldstein & Fox P.L.L.C.

(57) ABSTRACT

Systems, methods and computer program products for multicast database replication are described herein. An embodiment includes creating a replication group for replication of data. One or more replicate (or target) databases are subscribed to the replication group and the replication group may include one or more subscribed replicate databases. The replication group is associated with a replication group address. Embodiments send (or publish) data that is to be replicated to the replication group multicast address causing automatic replication of the data to the subscribed replicate databases. In this way, by sending data to be replicated once to a replication group address, the data is automatically replicated to several subscribed replicate databases and a replication server need not establish distinct point-to-point connections with each replicate database.

21 Claims, 7 Drawing Sheets

MULTICAST DATABASE REPLICATION

BACKGROUND

1. Field

Embodiments of the present invention relate to database systems, and more particularly to database replication.

2. Background Discussion

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

Data can be replicated or copied from a source (or primary) database to one or more replicate (or target) databases, so that both primary and replicate databases contain identical data.

Traditional database replication requires establishing distinct point-to-point connections between a primary database and each replicate database. Because a network has limited bandwidth, this limits the number of point-to-point connections, and therefore also limits the number of replicate databases that can be maintained within the network's bandwidth. Furthermore, when data in a primary database needs to be replicated to multiple replicate databases, network overhead and bandwidth use increases because the same primary database data needs to be transmitted separately to each replicate database over its respective point-to-point connection.

BRIEF SUMMARY

Briefly stated, the invention includes system, method, computer program product embodiments, and combinations and sub-combinations thereof, for multicast database replication.

An embodiment includes creating a replication group for replication of data. One or more replicate (or target) databases are subscribed to the replication group and the replication group may include one or more subscribed replicate databases. The replication group is associated with a replication group address. Embodiments send (or publish) data that is to be replicated to the replication group multicast address causing automatic replication of the data to the subscribed replicate databases.

In this way, by sending data to be replicated once to a replication group address, the data is automatically replicated to several subscribed replicate databases and a replication server (or primary database) need not establish distinct point-to-point connections with each replicate database. This approach reduces network overhead and bandwidth because the same primary database data need not be transmitted for replication separately to each replicate database over its respective point-to-point connection. Furthermore, because embodiments of the invention use less network bandwidth, a greater number of replicate databases can be efficiently maintained.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1A:
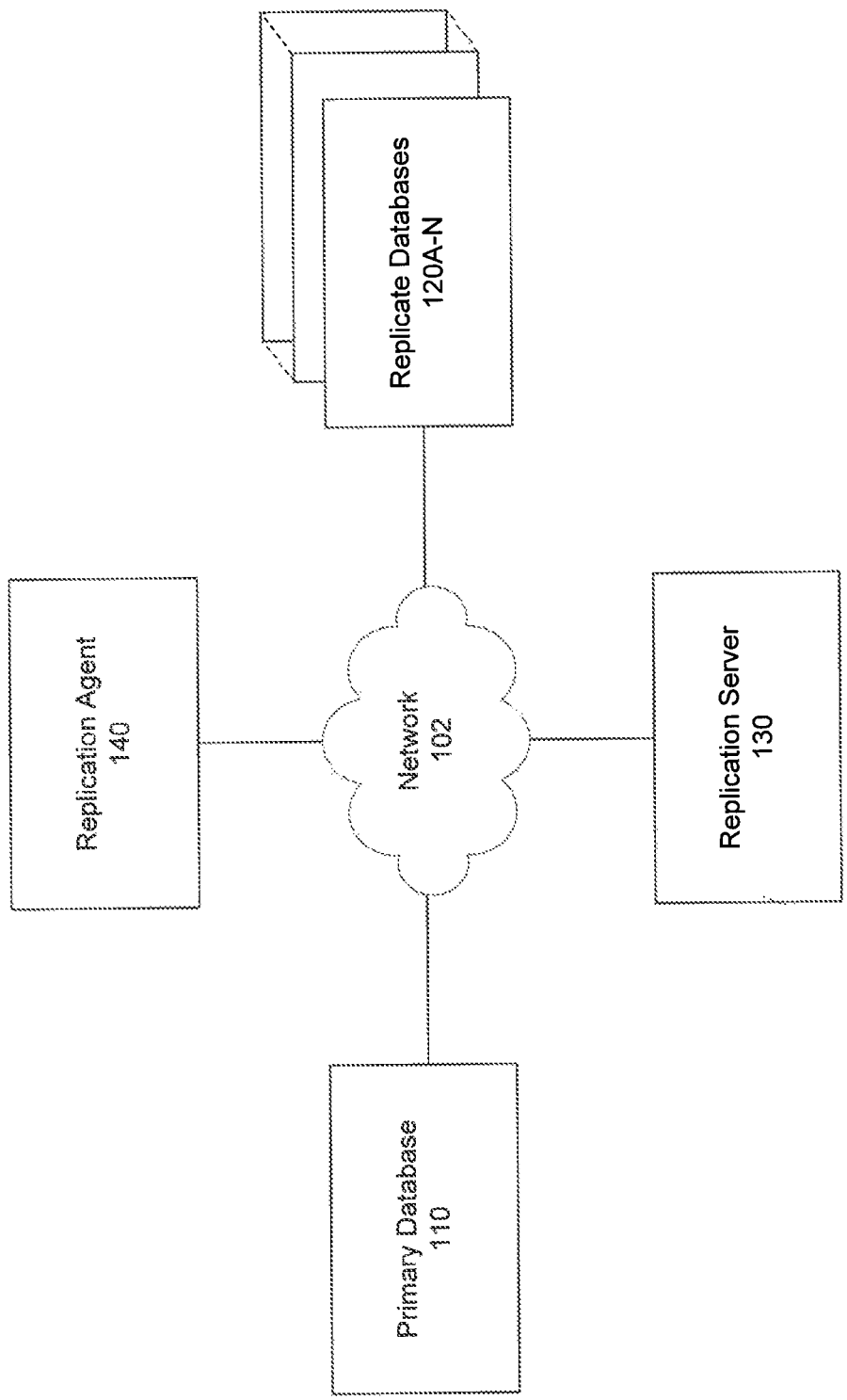
FIG. 1A is a diagram of an exemplary replication environment, according to an embodiment.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Embodiments of the present invention relate to systems, methods and computer program products for multicast database replication.

While embodiments of the present invention are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This section describes an exemplary replication environment, according to an embodiment of the invention illustrated in FIG. 1A.

FIG. 1A includes primary database 110, replication agent 140, replication server 130, replicate databases 120A-N and network 102. While the following is described in terms of multicasting, the invention is not limited to multicasting. Any other data dissemination protocol may be used in conjunction with the embodiments. The invention is applicable to any system having generally the structure of FIG. 1A, or that would benefit from the operation, methods and functions as described herein.

Primary database 110 may be any form of database and can include, but is not limited to, a device having one or more processors and memory for executing and storing instructions. As an example, not intended to limit the invention, MICROSOFT SQL SERVER from Microsoft Corporation of Redmond, Wash., may be used as primary database 110. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, primary database 110 is a source of transactions that manipulate and/or modify data in replicate databases 120A-N. Tables marked for replication in a primary database 110 may be known as marked tables (not shown). In an embodiment, a primary table is marked for replication (e.g., marked by a database administrator) so that replication agent 140 can identify and replicate transactions that affect the data in the table using replication server 130.

Replication agent 140 can capture replicated transactions (i.e., transactions occurring on marked tables) in primary database 110, and then may send those transactions to replication server 130 for distribution to replicate databases 120A-N. In an embodiment, replication agent 140 provides a transaction log of one or more transactions at primary database 110 to replication server 130. In an embodiment, replication agent 140 instantiates a replication agent thread in primary database 110 or any other components of system 100. A replication agent thread, according to an embodiment, is discussed further below.

In an embodiment, replication agent 140 runs as a stand-alone application, independent of primary database 110, replication server 130, and any other replication system component. In another embodiment, replication agent 140 may reside on the same host machine as, for example, primary database 110 or any other replication system component.

Replication server 130 can receive, from replication agent 140, transactions that are to be replicated at replicate databases 120A-N. In an embodiment, replication server 130 may send replicated transactions to replicate databases 120A-N in response to one or more commands from replication agent 140. In an embodiment, replicate databases 120A-N each include one or more replicated tables (not shown) that correspond to one or more marked tables at primary database 110. When replicated transactions are, for example, processed successfully by replicate databases 120A-N, replicated tables in replicate databases 120A-N are synchronized with corresponding marked tables in primary database 110.

Network 102 can be any type of network or combination of networks such as, but not limited to, a local area network, wide area network or the Internet. Network 102 can be a form of a wired network or a wireless network, or a combination thereof. Network 102 can allow primary database 110, replication server 130, replication agent 140, replicate databases 120A-N and any other networked components to communicate with each other.

Components of system 100 (i.e., replication agent 140, primary database 110, replication server 130 and replicate databases 120A-N) can be computing devices including one or more processors and may further include one or more modules implemented using one or more processors. Components of system 100 can include any form of physical storage such as hard-disk drives, flash drives, random access memory (RAM), and any computer-readable or computer-useable storage media that may be configured to store/execute instructions and data. An example computer useful for implementing components of the embodiments is described further below.

Figure 1B:
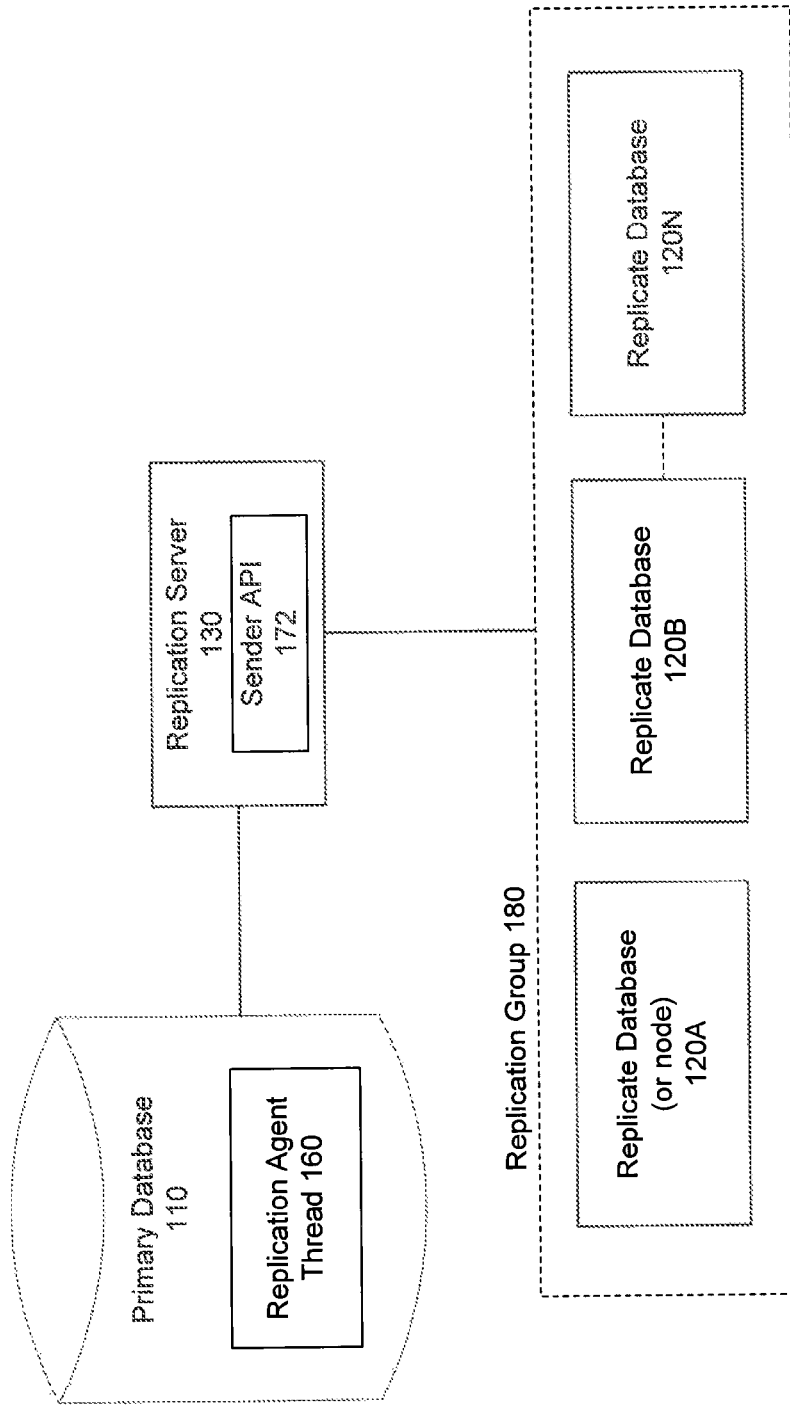
FIG. 1B illustrates an exemplary system for multicast database replication, according to an embodiment.

FIG. 1B illustrates an exemplary system for multicast database replication, according to an embodiment.

As discussed above, an embodiment for multicast database replication includes creating a replication group for replication of data. One or more replicate (or target) databases are enabled to subscribe to the replication group and the replication group may include one or more subscribed replicate databases. The replication group is associated with a replication group address. Embodiments send (or publish) data that is to be replicated to the replication group multicast address causing automatic replication of the data to the subscribed replicate databases. In an embodiment, not intended to limit the invention, multicasting according to the embodiments can use a user datagram protocol (UDP) as an underlying transport protocol to multicast replicated transactions to replicate databases 120A-N. As known to those skilled in the art, multicasting includes delivery of a message or information to a group of destination computers simultaneously in a single transmission from a source. Multicasting according to the embodiments is discussed further below.

Referring to FIG. 1B, system 150 includes primary database 110, replication server 130, replication agent thread 160 and a plurality of replicate or target databases 120A-N subscribed to replication group 180. Replication server 130 further includes sender application program interface (API) 172. In an embodiment, replication agent thread 160 is instantiated in primary database 110 by replication agent 140. In an embodiment, replication agent thread 160 captures replicated transactions (i.e., transactions occurring on marked tables) in primary database 110, and then may send those transactions to replication server 130 for distribution to replicate databases 120A-N.

In an embodiment, replication server 130 includes sender API 172 that is configured to distribute replicated transactions to replicate databases 120A-N. Sender API 120 can further interact with sender/distributor modules (not shown) that can interact with replicate databases 120A-N on behalf of sender API 172. In an embodiment, each replicate database 120A-N is associated with a receiver API and a replication server thread (not shown).

In a non-limiting embodiment, one or more replicate databases 120A-N are subscribed to replication group 180. In a non-limiting embodiment, replication group 180 can be a grid or multicast subnet. Although FIG. 1B illustrates a single replication group 180, embodiments of the invention and replication server 130 are configured to create (and may later remove) any number of replication groups, where each group includes one or more replicate databases.

Each replicate database 120A-N together with a receiver API can act as a node in replication group 180. In an embodiment, replication group 180 is associated with a replication group multicast address (or "replication group address"). Embodiments send data that is to be replicated to the replication group address causing multicast replication of the data to replicate databases 120A-N subscribed to replication group 180. In an exemplary scenario where more than one replication group exists, each replication group can be associated with a distinct replication group address.

In a non-limiting embodiment, replicate databases 120A-N may subscribe to replication group 180 by sending a subscription message to replication server 130. In an embodiment, replication server 120 may automatically add (or subscribe) replicate databases 120A-N to replication group 180 upon receipt of a subscription message from replicate databases 120A-N. In a non-limiting embodiment, replicate databases 120A-N may also be able to un-subscribe from replication group 180 by sending an un-subscribe message to replication server 130. In one non-limiting example, a replication group address can be any Internet protocol (IP) address. In another non-limiting example, a replication group address can be an address in a "Class D" address space (e.g., Internet addresses in the range of 224.0.0.0 to 239.255.255.255). These examples are purely illustrative and are not intended to limit the embodiments. Embodiments of the invention may use any form of addressing scheme known now or developed in the future.

As noted above, by sending data to be replicated once to a replication group address (e.g., replication group address of replication group 180), the data is automatically replicated to several replicate databases (e.g., replicate databases 120A-N) and a replication server 130 (or primary database 110) need not establish distinct point-to-point connections with each replicate database. This reduces network overhead and bandwidth because the same primary database data need not be transmitted for replication separately to each replicate database over its respective point-to-point connection. Furthermore, because embodiments of the invention use less network bandwidth, a greater number of replicate databases can be efficiently maintained. Embodiments of the invention support near linear scalability with respect to the number of replicate databases 120A-N that can be efficiently maintained as opposed to geometric scalability inherent in conventional point-to-point topology.

Figure 1C:
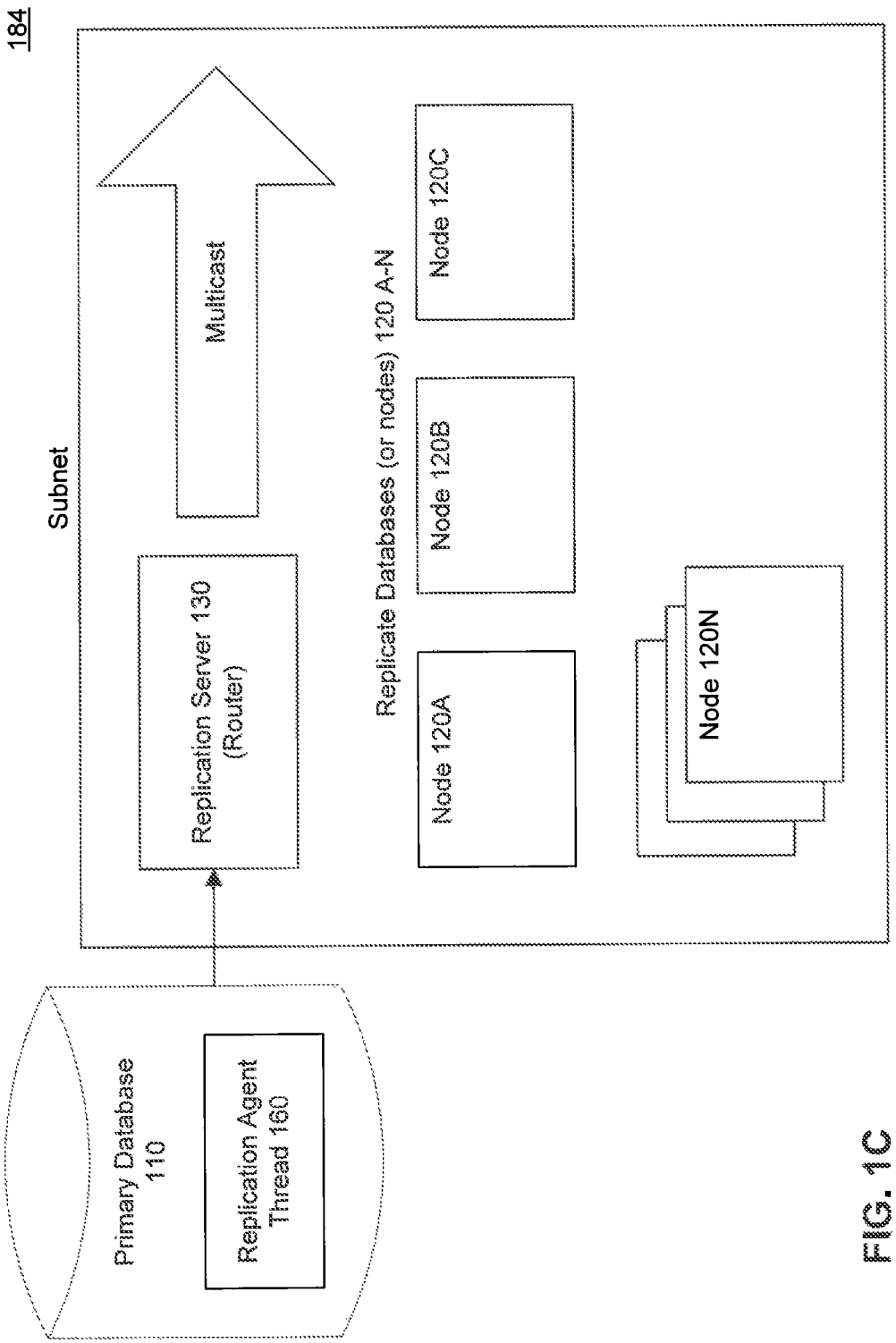
FIG. 1C illustrates a logical topology diagram of a system for multicast database replication, according to an embodiment.

FIG. 1C illustrates a logical topology diagram 184 of a system for multicast database replication, according to an embodiment.

As shown in FIG. 1C, diagram 184 includes primary database 110 and associated replication agent thread 160. Replication agent thread 160 can capture replicated transactions (i.e., transactions occurring on marked tables) in primary database 110, and then may send those transactions to replication server 130 for multicast replication to a plurality of replicate databases 120A-N which act as client nodes that receive multicast replicated transactions. In the embodiment, illustrated in FIG. 1C, replication server 130 acts as a router that multicasts transactions for replication to a plurality of client nodes.

Figure 1D:
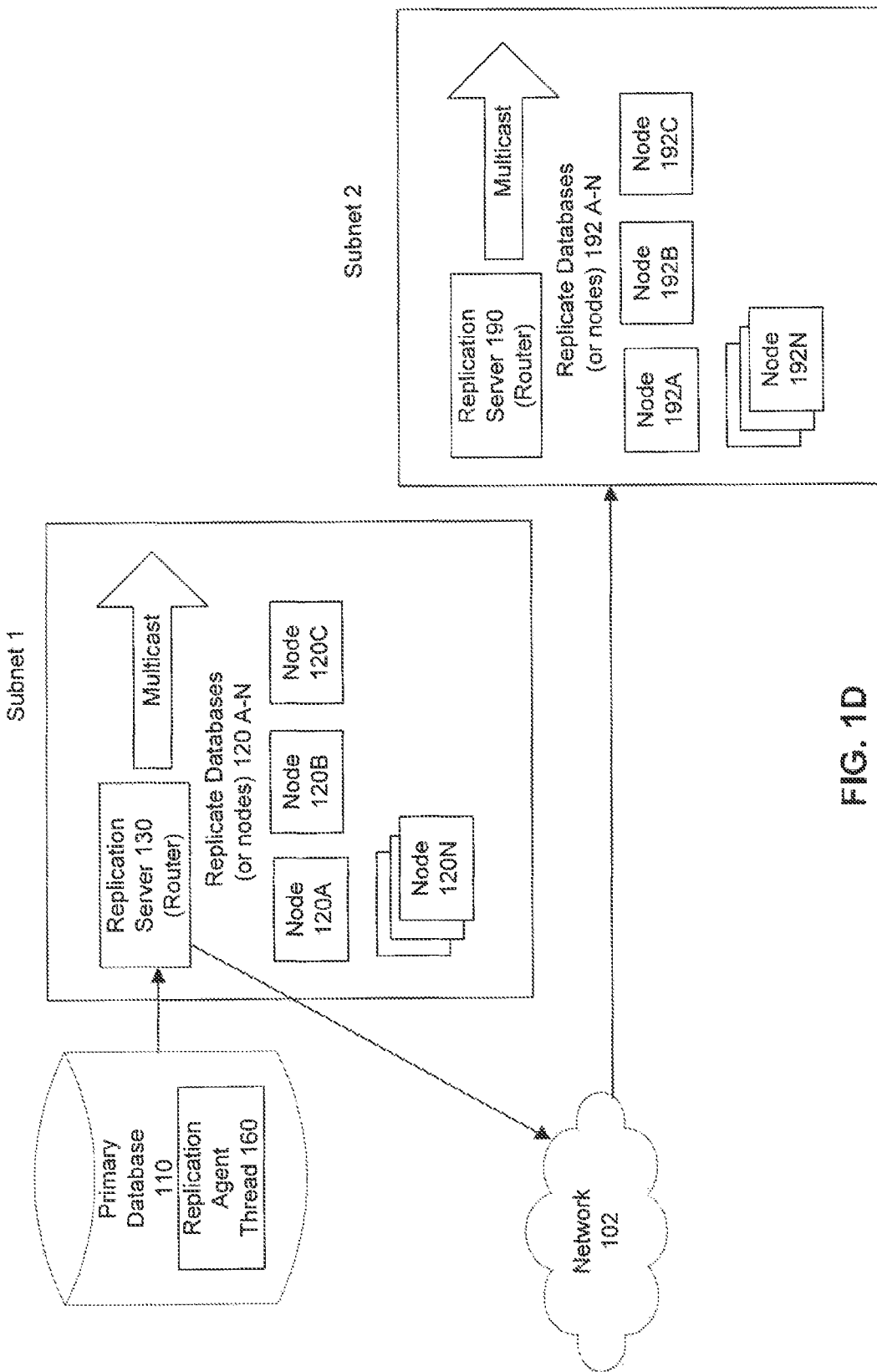
FIG. 1D illustrates a logical topology diagram of a system for multicast database replication, according to another embodiment.

FIG. 1D illustrates a logical topology diagram 186 of a system for multicast database replication, according to an embodiment that includes more than one replication group (e.g., multicast grid/sub-net 1 and 2). In the embodiment illustrated in FIG. 1D, replication server 130 in subnet 1 can not only multicast transactions for replication to replicate databases 120A-N, but also to subnet 2 over network 102. For example, replication server 130 in subnet 1 can establish a connection with replication server 190 in subnet 2 to provide transactions for replication to replicate databases 192A-N.

As noted above, multicasting according to the embodiments can use a user datagram protocol (UDP) as an underlying transport protocol to multicast transactions for replication to replicate databases 120A-N. It is to be appreciated that embodiments of the invention are not limited to UDP multicasting and may be used in conjunction with other multicasting or data dissemination protocols, known now, or developed in the future.

As known to those skilled in the art, in computer networking, the transport layer provides end-to-end communication services for applications within a layered architecture of network components and protocols. UDP is a simple "best-effort" data transmission protocol where there is generally no retransmission of data packets at the transport layer. Therefore, conventional multicast data transport is inherently unreliable. Accordingly, recipients of transmitted data packets may not receive all transmitted data packets. Some data packets may be delivered out of sequence and others may be dropped by a network during time of heavy load. To prevent such conventional reliability issues from affecting database replication, some embodiments of the invention provide an additional reliability protocol or layer in addition to a data transport layer (e.g., UDP data transport layer) to ensure that transactions are replicated with greater reliability. Replication reliability mechanisms, according to the embodiments, are discussed below.

Multicast replication according to the embodiments includes a sender (e.g., replication server 130), or publisher, and one or more recipients or subscribers (e.g., replicate databases 120A-N). In an embodiment, when a replicate database wishes to receive replicate data, the replicate database joins replication group 180. Once one or more replicate databases 120A-N have joined replication group 180, the replication server 180 is aware of replicate databases 120A-N that wish to receive replicate data. This subscribing process or initial "handshake," between replication server 130 and replicate databases 120A-N initiates establishment of a reliability protocol or layer, according to embodiments of the invention.

In an embodiment, when replication server 130 is ready to send data, replication server 130 creates a header for each replicate data payload packet. In an embodiment, the header includes control information specifying contents of the replicate data payload packet. In an embodiment, the control information includes a sequence number. In an embodiment, this sequence number initializes at zero when replication server 130 starts transmitting data packets, and is incremented by one for every packet sent by replication server 130.

In an embodiment, replication server 130, which acts as a publisher, maintains a list of subscribers or replicate databases 120A-N that have joined replication group 180. This subscriber list includes control information regarding subscribed replicate databases 120A-N including a sequence number of the last multicast replicate data packet that each replicate database 120A-N received.

In an embodiment, when a replicate database 120A receives a multicast replicate data packet from replication server 130, the replicate database 120A interrogates the header and determines if the packet is the next logical packet by sequence number. In an embodiment, if the packet is not the next logical packet by sequence number, replicate database 120A contacts replication server 130 and requests replication server 130 to re-send (or re-transmit) missing packet(s). In an embodiment, replicate database 120 continues to receive a stream of replicated data from replication server 130 while it awaits the missing packets.

In an embodiment, replicate databases 120A-N can each periodically send replication server 130 a sequence number of the last successful group of replication packets received, thereby acknowledging successful receipt of replication transactions. Conventional UDP based applications send an acknowledgement, (e.g., ACK) for each message or data packet that is received. In contrast, and according to embodiments of the invention, subscribed replicate databases 120A-N send acknowledge messages periodically for a successfully received group of replication packets, thereby reducing overhead of message acknowledgement transmission.

In an embodiment, replication agent 130 stores one or more packets sent to subscribing replicate databases 120A-N until it receives an acknowledgement confirming receipt of those packets from respective replicate databases 120A-N. In an embodiment, replication agent 130 stores (or maintains) one or more packets sent to subscribing replicate databases 120A-N until it receives an acknowledgement confirming receipt of those packets from a slowest responding replicate database of replicate databases 120A-N. In an embodiment, to accomplish this, replication server 130 maintains a series of linear buffers for each replicate database 120A-N. As replicated data packets are sent, replication server 130 places them in respective buffers in the order that the packets were sent to each replicate database 120A-N. Based on the status of the slowest responding subscribed replicate database, replication server 130 can then discard buffers that may no longer be needed based on the range of data packet sequence numbers that the buffers contain. For example, buffers including a range of data packet sequence numbers older than a predefined threshold may be discarded. Also, because replicate databases 120A-N send replication server 130 a sequence number of their last successfully received packet, replication server 130 can use the sequence number to discard messages from its buffer based on the sequence number of the last successfully received packet provided by a slowest responding replicate database 120A-N. As a non-limiting example, these buffers can reside in memory or they can be in both memory and disk based on speed and throughput requirements.

Figure 2:
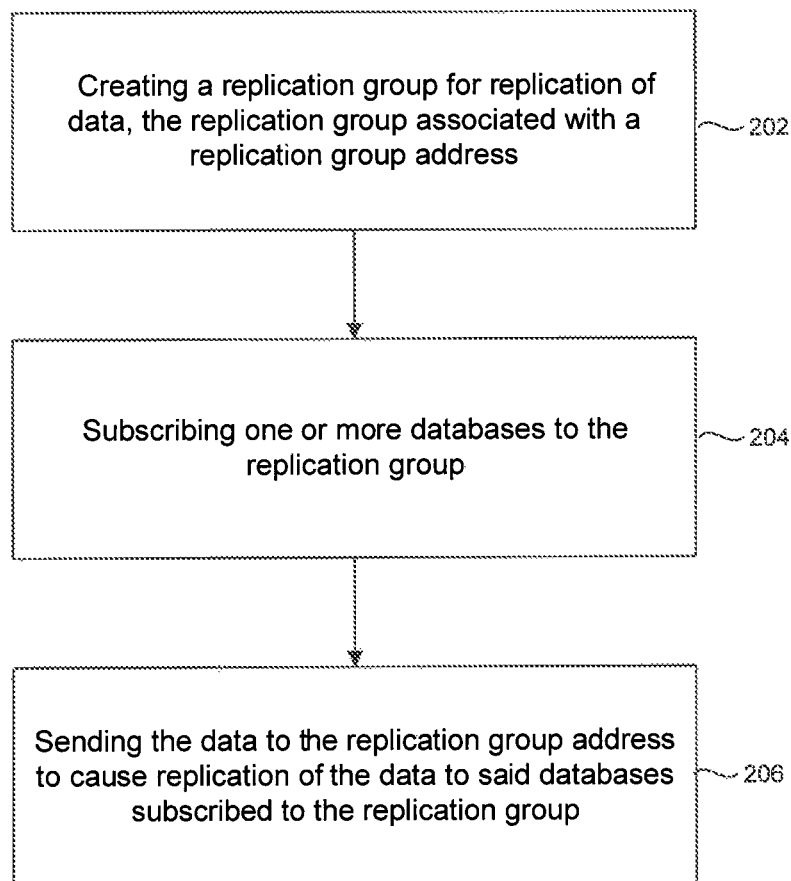
FIG. 2 is a flowchart illustrating an exemplary overall operation, according to an embodiment.

FIG. 2 is a flowchart illustrating method 200. Method 200 illustrates an exemplary overall operation, according to an embodiment.

Method 200 begins with creating a replication group for replication of data, where the replication group is associated with a replication group address (step 202). As an example replication server 130 can create replication group 180. Replication group 180 can be associated with a replication group address.

One or more databases then subscribe to the created replication group (step 204). As an example, replicate databases 120A-N are subscribed to replication group 180.

Method 200 proceeds by sending data to the replication group address to cause replication of the data to the databases subscribed to the replication group (step 206). As an example, replication server 130 sends data that is to be replicated to the replication group address causing multicast replication of the data to replicate databases 120A-N.

Figure 3:
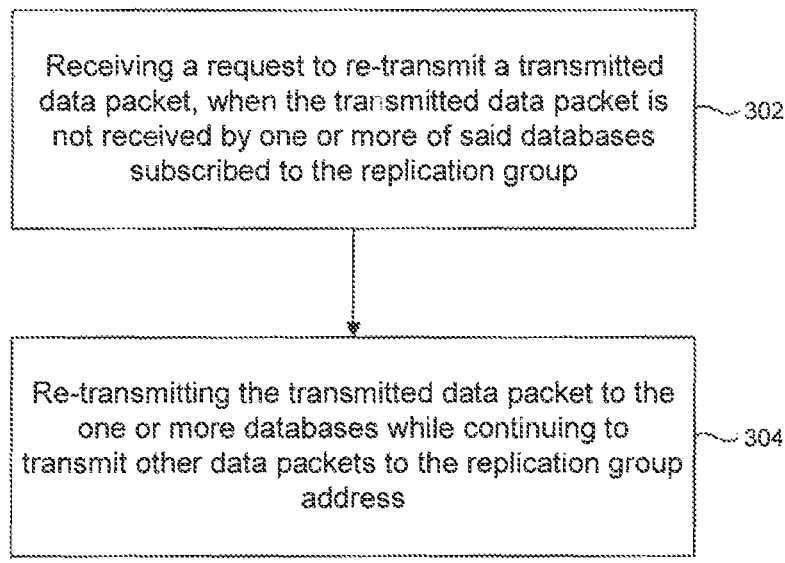
FIG. 3 is a flowchart illustrating an operation for re-transmission of replicated data packets, according to an embodiment

FIG. 3 is a flowchart illustrating method 300. Method 300 illustrates an operation for re-transmission of replicated data packets, according to an embodiment.

Method 300 begins with receiving a request to re-transmit a transmitted data packet, when the transmitted data packet is not received by one or more of databases subscribed to a replication group (step 302). As an example, a data packet transmitted by replication server 130 may not be received by replicate database 120A. Replicate database 120A can then provide a request to replication server 130 to re-transmit the data packet.

Method 300 proceeds by re-transmitting the data packet to the one or more databases while continuing to transmit other data packets to the replication group address (step 304).

Embodiments of the invention provide a publish/subscribe replication method that enables replication server 130 (and/or replication agent thread 160) to act as a publisher and replicate databases 120A-N to act as subscribers.

With reference to network reliability, embodiments of the invention provide a reliability layer to increase replication reliability of the multicast transport layer of the embodiments. In addition, embodiments can be configured to support multiple networks and can have redundant components, without having a single point of failure. Embodiments of the invention can also provide greater fault tolerance by ensuring reliable delivery of replicated transactions.

With reference to network performance, embodiments of the invention support near linear scalability with respect to the number of replicate databases 120A-N that can be efficiently maintained. Furthermore, because replication server 120 need not establish a distinct point-to-point connection with each replicate database 120A-N, network bandwidth utilized by the embodiments is scalable to network speed for replicate databases 120A-N. Also, for example, each unique replicated row needs to be sent (or published) once for replication regardless of the number of subscribed replicate databases 120A-N.

With reference to network security, embodiments can encrypt data that is sent to a replication group address for replication to replicate databases 120A-N. Furthermore, in an embodiment, replication server 130 can authenticate replicate databases that intend to subscribe to a given replication group address. In this way, certain authenticated replicate databases may receive replicated data from primary database 110.

Example Computer Embodiment

Figure 4:
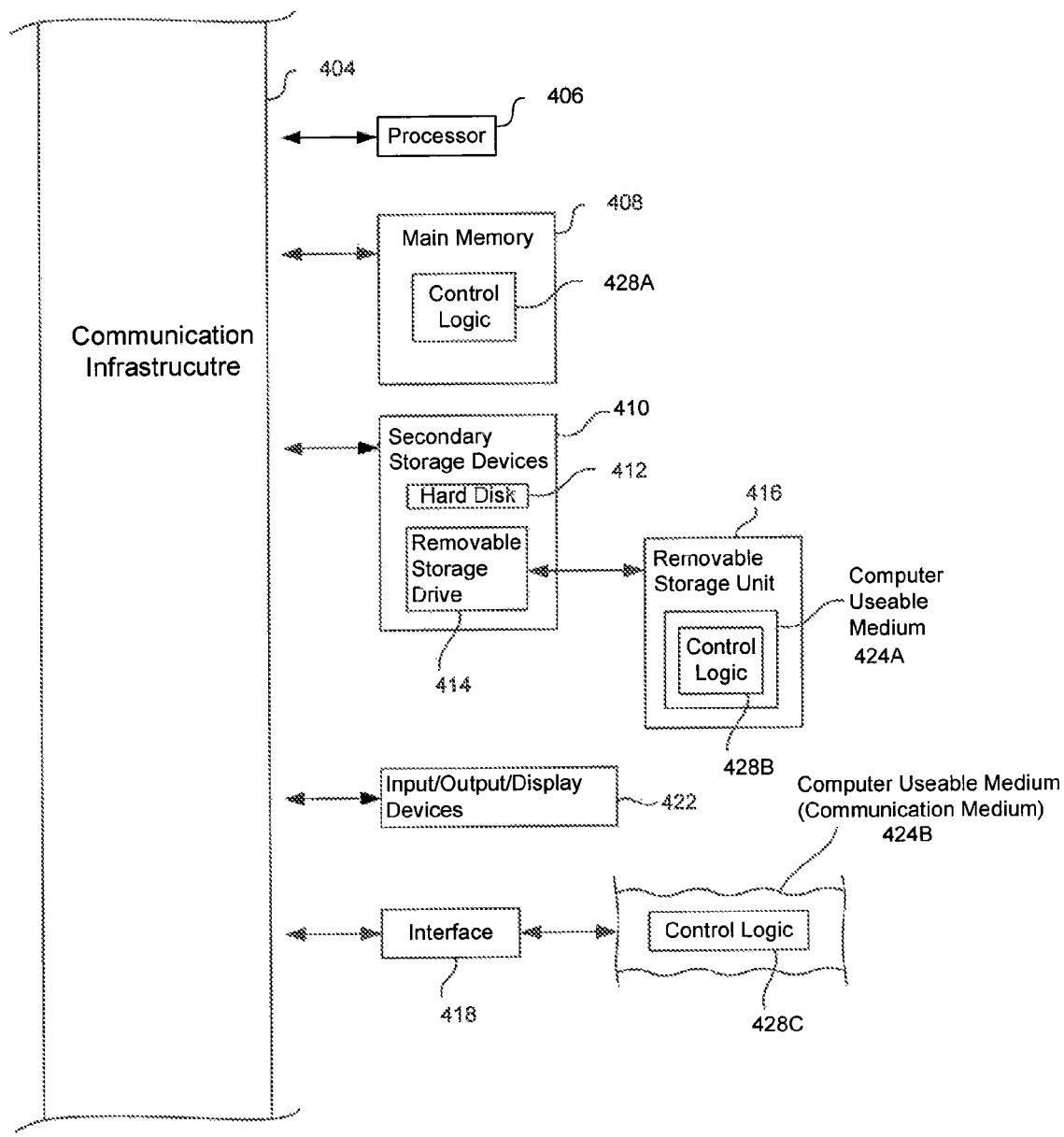
FIG. 4 illustrates an example computer useful for implementing components of the embodiments.

In an embodiment of the present invention, the system and components of embodiments described herein are implemented using well known computers, such as computer 402 shown in FIG. 4. For example, replication server 130, replication agent 140, primary database 110, replicate databases 120A-N, and any modules therein can be implemented using computer (s) 402.

The computer 402 can be any commercially available and well known computer capable of performing the functions described herein, such as computers available from International Business Machines, Apple, Sun, HP, Dell, Compaq, Cray, etc.

The computer 402 includes one or more processors (also called central processing units, or CPUs), such as a processor 406. The processor 406 is connected to a communication infrastructure 404.

The computer 402 also includes a main or primary memory 408, such as random access memory (RAM). The primary memory 408 has stored therein control logic 428A (computer software), and data.

The computer 402 also includes one or more secondary storage devices 410. The secondary storage devices 410 include, for example, a hard disk drive 412 and/or a removable storage device or drive 414, as well as other types of storage devices, such as memory cards and memory sticks. The removable storage drive 414 represents a floppy disk drive, a magnetic tape drive, a compact disk drive, an optical storage device, tape backup, etc.

The removable storage drive 414 interacts with a removable storage unit 416. The removable storage unit 416 includes a computer useable or readable storage medium 424A having stored therein computer software 428B (control logic) and/or data. Removable storage unit 416 represents a floppy disk, magnetic tape, compact disk, DVD, optical storage disk, or any other computer data storage device. The removable storage drive 414 reads from and/or writes to the removable storage unit 416 in a well-known manner.

The computer 402 also includes input/output/display devices 422, such as monitors, keyboards, pointing devices, etc.

The computer 402 further includes a communication or network interface 418.

The network interface 418 enables the computer 402 to communicate with remote devices. For example, the network interface 418 allows the computer 402 to communicate over communication networks or mediums 424B (representing a form of a computer useable or readable medium), such as LANs, WANs, the Internet, etc. The network interface 418 may interface with remote sites or networks via wired or wireless connections.

Control logic 428C may be transmitted to and from the computer 402 via the communication medium 424B.

Any apparatus or manufacture comprising a computer useable or readable medium having control logic (software) stored therein is referred to herein as a computer program product or program storage device. This includes, but is not limited to, the computer 402, the main memory 408, secondary storage devices 410 and removable storage unit 416. Such computer program products, having control logic stored therein that, when executed by one or more data processing devices cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for database replication, comprising:
    creating a first replication group and a second replication group for replication of data from one or more tables of one or more databases that are marked for replication, wherein said databases also comprise one or more tables not marked for replication, wherein each replication group is associated with its own unique replication group address;
    subscribing one or more databases to said first replication group and said second replication group;
    maintaining a list of databases subscribed to each replication group;
    transmitting a first set of data to a first replication group address to cause replication of said first set of data to said databases subscribed to said first replication group, wherein said databases subscribed to said first replication group periodically send acknowledge messages for successfully received data packets of said transmitted data and wherein each acknowledge message is sent for a plurality of said successfully received data packets;
    receiving a request to re-transmit a missing data packet from the first set of data, when said missing data packet is not received by one or more of said databases subscribed to said first replication group; and
    re-transmitting said missing data packet to said one or more of said databases while continuing to transmit said first set of data to said first replication group address, and
    wherein said creating, said subscribing and said sending are performed using one or more processors.

2. The method of claim 1, wherein performance of said replication is independent of a change in a number of said databases.

3. The method of claim 1, the transmitting comprising:
    transmitting said first set of data to said first replication group address as data packets, each data packet comprising a replication data payload and header, said header comprising a packet sequence number.

4. The method of claim 3, further comprising:
    incrementing said sequence number for each data packet transmitted to said first replication group address.

5. The method of claim 1, wherein said list comprises control information of said databases and sequence numbers of data packets transmitted to said databases.

6. The method of claim 3, further comprising:
    caching said transmitted data packet until an acknowledgement is received from a receiving replicate database.

7. The method of claim 6, wherein said caching comprises:
    maintaining one or more linear buffers to store said transmitted data packet and other transmitted data packets.

8. The method of claim 4, wherein said data is replicated to said databases using a user datagram multicast protocol.

9. The method of claim 1, wherein said list includes, for each subscribed database of each replication group, a sequence number of the last multicast replicate data packet that the respective database of the respective group received, wherein the sequence number for each group initializes at zero and increments by one for every data packet transmitted to the replication group address.

10. The method of claim 9, wherein transmitted data older than the earliest received sequence number is discarded from a cache.

11. A processor-based system for database replication, comprising:
    a first hardware computer processor configured to create a first replication group and a second replication group for replication of data from one or more tables of one or more databases that are marked for replication, wherein said databases also comprise one or more tables not marked for replication, wherein each replication group is associated with its own unique replication group address;
    a second hardware computer processor configured to:
        subscribe one or more databases to said first replication group and said second replication group, and
        maintain a list of databases subscribed to each replication group; and a third hardware computer processor configured to:
        send a first set of data to a first replication group address to cause replication of said first set of data to said databases subscribed to said first replication group, wherein said databases subscribed to said first replication group periodically send acknowledge messages for successfully received data packets of said transmitted data and wherein each acknowledge message is sent for a plurality of said successfully received data packets, receive a request to re-transmit a missing data packet from the first set of data, when said missing data packet is not received by one or more of said databases subscribed to said first replication group, and re-transmit said missing data packet to said one or more of said databases while continuing to transmit said first set of data to said first replication group address.

12. The system of claim 11, wherein performance of said replication is independent of a change in a number of said databases.

13. The system of claim 11, further comprising:
a fourth module configured to transmit said first set of data to said first replication group address as data packets, each data packet comprising a replication data payload and header, said header comprising a packet sequence number.

14. The system of claim 13, further comprising:
a fifth module configured to increment said sequence number for each data packet transmitted to said first replication group address.

15. The system of claim 11, wherein said list comprises control information of said databases and sequence numbers of data packets transmitted to said databases.

16. The system of claim 13, further comprising:
a fifth module configured to cache said transmitted data packet until an acknowledgement is received from a receiving replicate database.

17. The system of claim 16, further comprising:
a sixth module configured to maintain one or more linear buffers to store said transmitted data packet and other transmitted data packets.

18. The system of claim 14, wherein said data is replicated to said databases using a user datagram multicast protocol.

19. A non-transitory computer-readable storage device having instructions stored thereon, execution of which, by a processing device, causes the processing device to perform operations comprising:
creating a first replication group and a second replication group for replication of data from one or more tables of one or more databases that are marked for replication, wherein said databases also comprise one or more tables not marked for replication, wherein each replication group is associated with its own unique replication group address;

maintaining a list of one or more replicate databases subscribed to each replication group, wherein one or more databases are subscribed to each replication group;

identifying one or more database rows that are to be replicated to the one or more replicate databases based on the marking;

establishing a reliability layer for sequential transmission and re-transmission of data packets representing said identified database rows;

multicasting said data packets to said replicate databases of the first replication group using a multicast transport layer associated with said reliability layer, wherein said replicate databases periodically send acknowledge messages for successfully received data packets and wherein each acknowledge message is sent for a plurality of said successfully received data packets;

receiving a request to re-transmit a missing data packet, when said missing data packet is not received by one or more of said databases subscribed to said replication group; and re-transmitting said missing data packet to said one or more of said databases while continuing to transmit said data to said replication group address.

20. The non-transitory computer-readable storage device of claim 19, wherein said reliability layer includes one or more linear buffers configured to store transmitted data packets.

21. The method of claim 1, wherein said acknowledgement messages includes an acknowledgement confirming receipt of said transmitted data from a slowest responding replicate database.

* * * * *